(12) United States Patent
Takata

(10) Patent No.: US 8,054,405 B2
(45) Date of Patent: Nov. 8, 2011

(54) LIGHTING DEVICE FOR DISPLAY DEVICE, DISPLAY DEVICE AND TELEVISION RECEIVER

(75) Inventor: Yoshiki Takata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 276 days.

(21) Appl. No.: 12/513,399

(22) PCT Filed: Jul. 31, 2007

(86) PCT No.: PCT/JP2007/064942
§ 371 (c)(1),
(2), (4) Date: May 4, 2009

(87) PCT Pub. No.: WO2008/084570
PCT Pub. Date: Jul. 17, 2008

(65) Prior Publication Data
US 2010/0014023 A1    Jan. 21, 2010

(30) Foreign Application Priority Data

Jan. 10, 2007 (JP) .................................. 2007-002670

(51) Int. Cl.
*G02F 1/1335* (2006.01)
(52) U.S. Cl. ................ 349/62; 349/64; 349/67; 349/68; 349/70
(58) Field of Classification Search .................. None
See application file for complete search history.

(56) References Cited

U.S. PATENT DOCUMENTS

| 5,283,673 | A | * | 2/1994 | Murase et al. .................. 349/65 |
| 5,751,386 | A | * | 5/1998 | Kanda et al. .................... 349/65 |
| 5,796,450 | A | * | 8/1998 | Kanda et al. .................... 349/64 |
| 2003/0031453 | A1 | * | 2/2003 | Tsubokura et al. ........... 385/147 |
| 2003/0214718 | A1 | * | 11/2003 | Kaminsky et al. ............ 359/599 |
| 2005/0135118 | A1 | | 6/2005 | Takata |
| 2006/0139952 | A1 | | 6/2006 | Inoue et al. |

FOREIGN PATENT DOCUMENTS

| JP | 06-075216 A | 3/1994 |
| JP | 09-329712 A | 12/1997 |
| JP | 2002-323607 A | 11/2002 |
| JP | 2003-331604 A | 11/2003 |
| JP | 2005-202361 A | 7/2005 |
| JP | 2007-025150 A | 2/2007 |
| WO | 2004/038283 A1 | 5/2004 |

OTHER PUBLICATIONS

Official Communication issued in International Patent Application No. PCT/JP2007/064942, mailed on Aug. 28, 2007.

* cited by examiner

*Primary Examiner* — Hemang Sanghavi
(74) *Attorney, Agent, or Firm* — Keating & Bennett, LLP

(57) ABSTRACT

A lighting device for a display device includes a display panel, a light source, and an optical member to be arranged between the light source and the display panel. The optical member has light reflectivity that is higher at an end of the plane of the optical member than at the center thereof.

16 Claims, 12 Drawing Sheets

LIGHTING DEVICE FOR DISPLAY DEVICE, DISPLAY DEVICE AND TELEVISION RECEIVER

BACKGROUND OF THE INVENTION

1. Field of the Invention

The present invention relates to a lighting device for a display device, a display device and a television receiver.

2. Description of the Related Art

A liquid crystal panel, used in a liquid crystal display device such as a liquid crystal TV set, cannot emit light itself, and therefore a backlight device should be additionally provided as an external lamp. The backlight device is arranged on the back of the liquid crystal panel. The backlight device includes a metallic chassis having an opening on the liquid crystal panel side, and further includes a number of cold cathode tubes as lamps arranged in the chassis. Further included are a number of optical members (such as a diffuser plate), which are arranged in the opening of the chassis so that the lights from the cold cathode tubes can be effectively applied to the liquid crystal panel. An example of a backlight device thus including optical members is disclosed in JP-A-2005-202361.

The backlight device disclosed in JP-A-2005-202361 includes optical members such as a diffuser plate, which has a superior heat releasing property. According to this construction, the luminescent efficiency reduction in the cold cathode tubes can be prevented or suppressed due to the heat release. In the conventional backlight devices including the backlight device disclosed in JP-A-2005-202361, the optical members such as a diffuser plate have homogeneous surfaces. That is, the optical members have properties such as transmittivity or reflectivity, uniformly distributed over their surfaces.

The backlight device thus including optical members having homogeneous surfaces is prone to having illumination brightness uniformly distributed over its surface. However, this construction is not suitable for enhancing the front brightness at the central display area of a liquid crystal display device, for example. Particularly, the growing panel size of a liquid crystal display device will result in a growing need for a technique for enhancing the front brightness.

SUMMARY OF THE INVENTION

In view of the problems described above, preferred embodiments of the present invention provide a lighting device for a display device, which has a construction capable of contributing to enhancement of the central brightness of the display device. In addition, preferred embodiments of the present invention provide a display device including the lighting device, and provide a television receiver including the display device.

One preferred embodiment of the present invention provides a lighting device for a display device to be used for a display device having a display panel. The lighting device includes a light source and an optical member to be arranged between the light source and the display panel. The optical member has light reflectivity that is higher at an end of the plane of the optical member than at a center thereof.

A display device according to a preferred embodiment of the present invention includes a lighting device for a display device described above, and a display panel for providing display by use of light from the lighting device for a display device.

A liquid crystal panel can exemplify the above display panel. The display device as a liquid crystal display device has a variety of applications, such as a television display or a personal-computer display. Particularly, it is suitable for a large-screen display.

A television receiver according to another preferred embodiment of the present invention includes a display device described above.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Preferred embodiments according to the present invention will be hereinafter explained with reference to the drawings.

Figure 1:
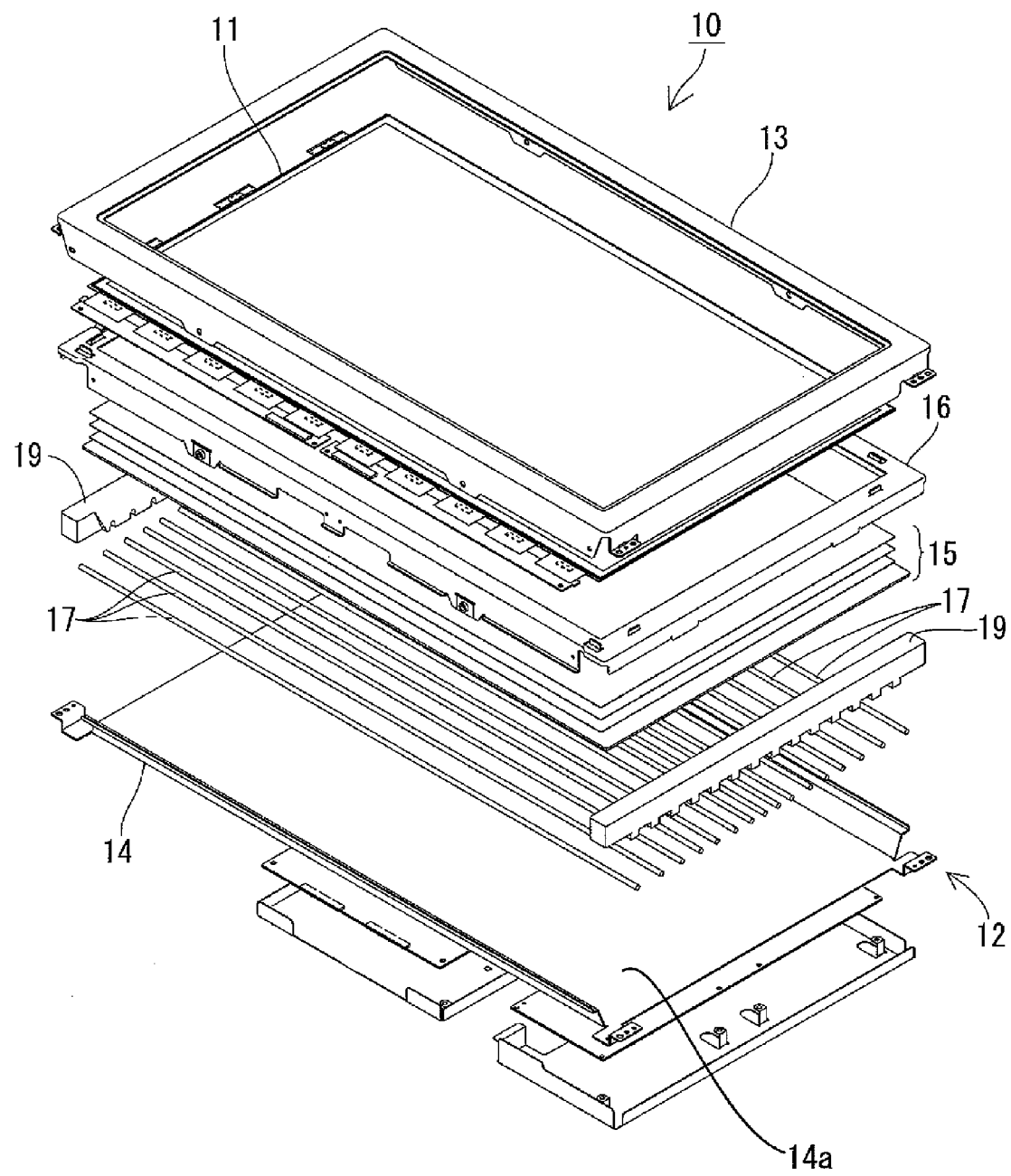
FIG. 1 is an exploded perspective view showing the general construction of a liquid crystal display device according to a present embodiment of the present invention.
Figure 2:
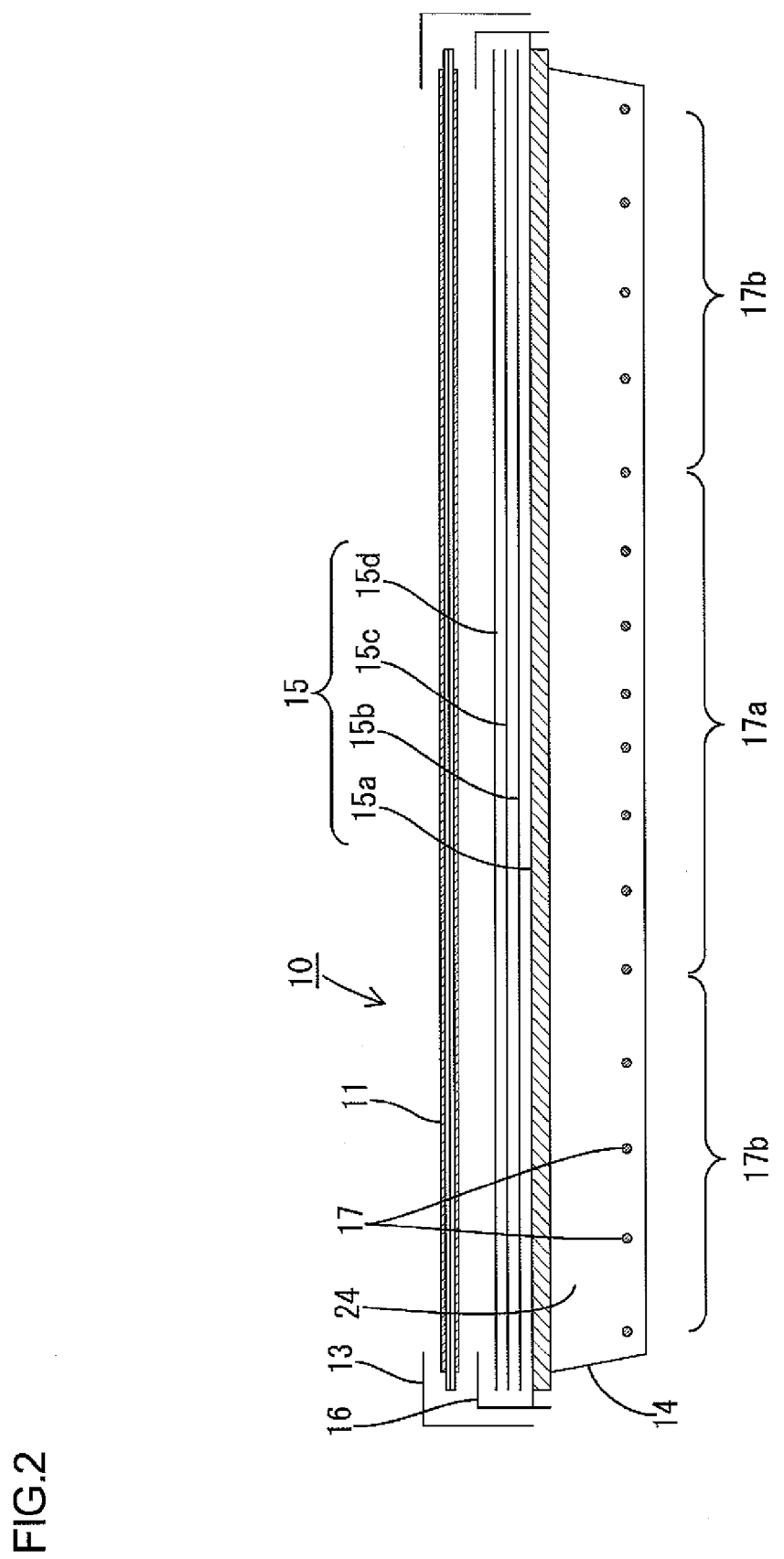
FIG. 2 is a sectional view showing the general construction of the liquid crystal display device according to a present embodiment of the present invention.
Figure 3:
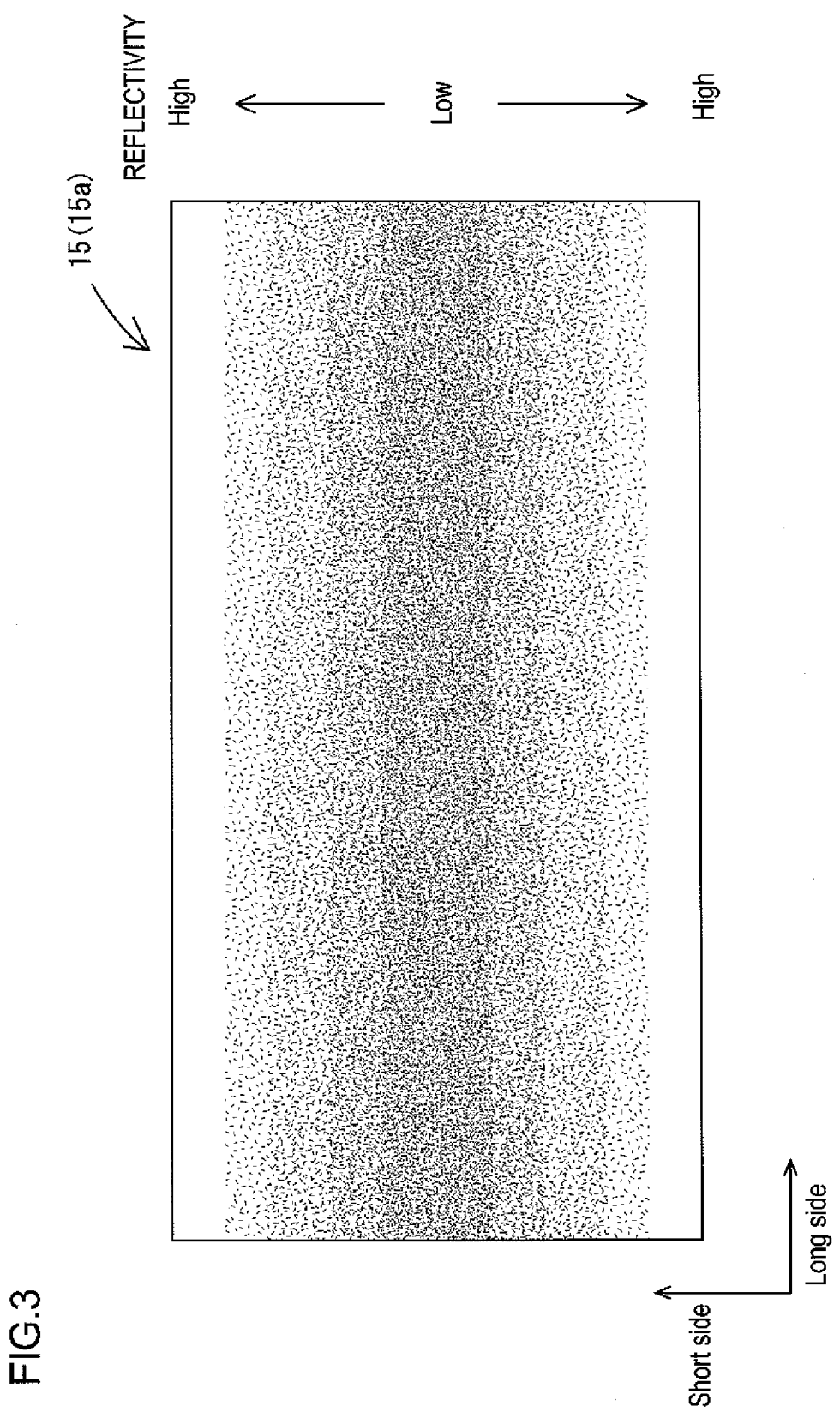
FIG. 3 is an explanatory diagram showing the reflectivity configuration of a diffuser plate included in a backlight device of the liquid crystal display device.
Figure 10:
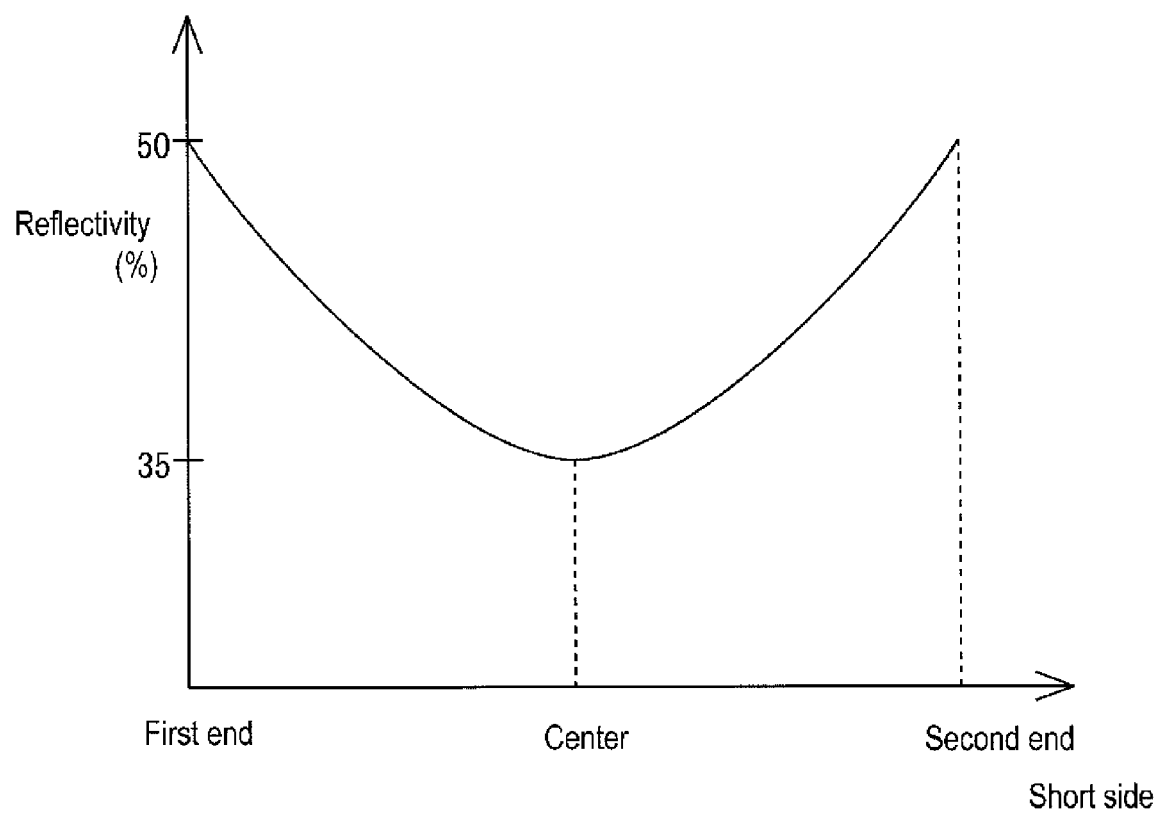
FIG. 10 is a graph showing the reflectivity that varies along the short side of the diffuser plate shown in FIG. 3.
Figure 12:
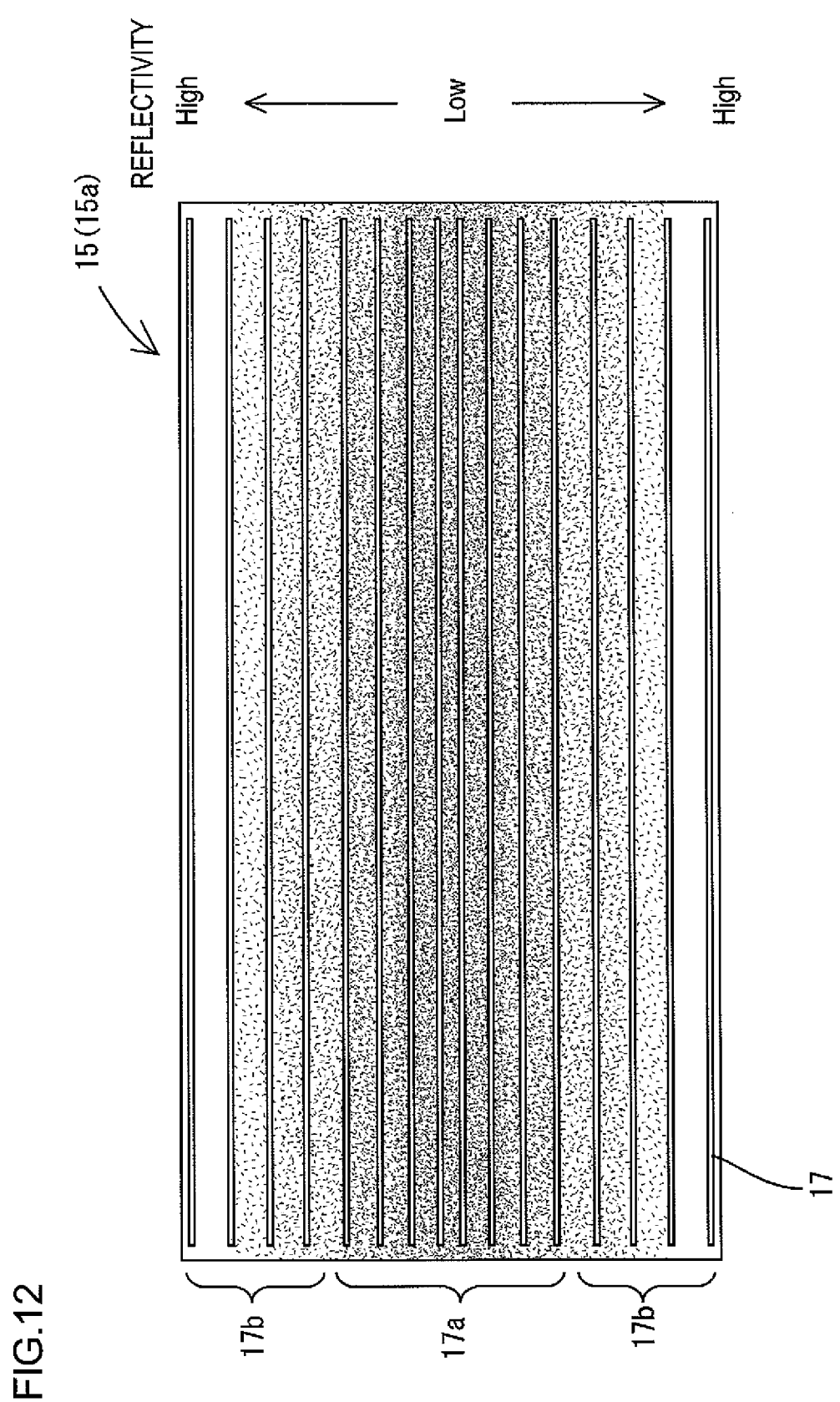
FIG. 12 is an explanatory diagram showing the relative positional relationship between a diffuser plate and cold cathode tubes.

FIG. 1 is an exploded perspective view showing the general construction of a liquid crystal display device (display device) 10 according to the present preferred embodiment. FIG. 2 is a sectional view showing the general construction of the liquid crystal display device (or the display device) 10 according to the present preferred embodiment. FIG. 3 is an explanatory diagram showing the reflectivity (light reflectivity) configuration of a diffuser plate 15a (or an optical member 15) included in a backlight device (or a lighting device for a display device) 12 of the liquid crystal display device 10. FIG. 10 is a graph showing the reflectivity that varies along the short side of the diffuser plate 15a. FIG. 12 is an explanatory diagram showing the relative positional relationship between the diffuser plate 15a and cold cathode tubes 17.

The overview of the liquid crystal display device or display device 10 will be explained first.

Referring to FIGS. 1 and 2, the liquid crystal display device 10 includes a liquid crystal panel, corresponding to a display panel 11, having a rectangular shape, and a backlight device 12 as an external light source, which are integrally held by a bezel 13 and the like. The liquid crystal panel 11 includes a pair of glass substrates, which are attached to each other so as to face each other while a gap of a predetermined size is kept therebetween. Liquid crystal is disposed between the glass substrates. Switching elements (e.g., TFTs) connected to a source wiring line and a gate wiring line running at right angles to each other, and pixel electrodes connected to the switching elements are provided on one of the glass substrates. A counter electrode, a color filter formed of R, G, and B color sections, and the like, are provided on the other of the glass substrates.

Next, the backlight device or lighting device for a display device 12 will be explained.

The backlight device 12 is a so-called direct-light type backlight device that includes light sources (e.g., linear light sources such as cold cathode tubes 17, in the present preferred embodiment), which are positioned directly below the back surface of the liquid crystal panel 11 (i.e., the panel surface on the opposite side of the display side), and are arranged parallel to one another and along the panel surface.

The backlight device 12 of the liquid crystal display device 10 includes a rectangular metallic chassis 14 having a substantially box-like shape with an opening on its upper side, and a plurality of optical members 15 arranged to cover the opening of the chassis 14. Further included are a frame 16 arranged to hold the optical members 15 on the chassis 14, cold cathode tubes or lamps 17 contained in the chassis 14, and lamp holders 19 arranged to cover and lump the cold cathode tubes 17 together. The cold cathode tubes 17 are mounted to the chassis 14 via lamp clips which are not shown.

The chassis 14 has a box-shaped configuration preferably formed of sheet metal, and a light reflective member made of synthetic resin is provided on the inner surface thereof. According to the construction, the light emitted by the cold cathode tubes 17 in the opposite direction from the light emitting side (i.e., in the opposite direction from the liquid crystal panel 11 side) can be reflected by the chassis 14 to the light emitting side, resulting in improvement of light use efficiency.

The optical members 15 are arranged between the liquid crystal panel 11 and the cold cathode tubes 17. In the present preferred embodiment, as shown in FIG. 2, a diffuser plate 15a, a diffusing sheet 15b, a lens sheet 15c and an optical sheet 15d are provided in this order, from the lower side of the figure. However, the optical members 15 are not limited to this combination. Another optical member can be added, or alternatively, some of the above optical members may be eliminated.

The diffuser plate 15a is a plate-like optical member having a function of diffusing the light from the cold cathode tubes 17. Thereby, the light from the cold cathode tubes 17 is diffused, so that light with uniform brightness can be applied to the liquid crystal panel 11. The diffusing sheet 15b is a film member also having a function of diffusing the light from the cold cathode tubes 17. The lens sheet 15c is a film that has a function of deflecting the light from the cold cathode tubes 17 in order to enhance the front brightness per unit area of display. The optical sheet 15d is a film capable of enhancing the brightness of light from the cold cathode tubes 17.

Particularly, in the present preferred embodiment, one of the optical members 15 is formed of an optical member having light reflexibility (i.e., formed of a light reflective optical member). Thereby, the incident light from the cold cathode tubes 17 can be reflected or transmitted selectively, i.e., can be broadly separated into the light to be transmitted and the light to be reflected. In the present preferred embodiment, the reflectivity (light reflectivity), which represents the reflected fraction of incident light, varies depending on the positions on the plane of the optical member 15. Specifically, the reflectivity is higher at ends of the plane of the optical member 15 than at the center of the plane.

FIG. 3 is an explanatory diagram showing the reflectivity distribution on the diffuser plate 15a. FIG. 10 is a graph showing the reflectivity that varies along the short side of the diffuser plate 15a. In FIG. 10, the horizontal axis is a scale of the short side, and the graph obtained by plotting the reflectivity varying along the short side extending from the first end to the second end through the center is shown. Note that the first end and the second end are not distinguishable and therefore may correspond to the ends of the short side in any combination.

The diffuser plate 15a having the long side and the short side is thus configured to have reflectivity varying along the short side. In the present preferred embodiment, the reflectivity of the diffuser plate 15a increases continuously and gradually from the center of its plane to the ends. The reflectivity at the ends preferably is about 50%, while the reflectivity at the center preferably is about 35%, for example. The reflectivity varies from the ends to the center so as to decrease continuously from about 50% to about 35%, for example.

The diffuser plate 15a has a construction in which diffusing particles or diffusing members are distributed over a light transmissive base member. The light reflectivity of the diffuser plate 15a can be configured to have the above distribution, by adjusting the combination ratio (as weight percent ratio) of diffusing particles to the light transmissive base member, for example. That is, a relative increase in a combination ratio of diffusing particles causes relative increase in light reflectivity, while a relative decrease in the combination ratio of diffusing particles causes a relative decrease in light reflectivity.

Each of the cold cathode tubes 17 preferably is a linear light source that extends in one direction so as to form an elongated tubular shape. The plurality (e.g., eighteen in the present preferred embodiment) of cold cathode tubes 17 arranged parallel to one another are contained in the chassis 14 so that the longitudinal direction or axial direction thereof corresponds to the longitudinal direction of the chassis 14. As shown in FIG. 2, the cold cathode tubes 17 are arranged so that a narrow-interval area 17a where the intervals between the cold cathode tubes 17 are relatively narrow and wide-interval areas 17b where the intervals between the cold cathode tubs 17 are relatively wide are provided. The narrow-interval area 17a is positioned in the array direction of the cold cathode tubes 17 so as to be on the center, and therefore is positioned on the center of the backlight device 12 or the liquid crystal display device 10. The wide-interval areas 17b are positioned in the array direction of the cold cathode tubes 17 so as to be on the ends, and therefore are positioned on the ends of the backlight device 12 or the liquid crystal display device 10.

Referring to FIG. 12, the central area of the diffuser plate 15a with relatively low reflectivity is arranged to overlap with the narrow-interval area 17a that includes narrowly-spaced cold cathode tubes 17. The end areas of the diffuser plate 15a with relatively high reflectivity are arranged to overlap with the wide-interval areas 17b that include widely-spaced cold cathode tubes 17. Therefore, a relatively large amount of illumination light emitted from the narrow-interval area 17a is transmitted through the area of the diffuser plate 15a having relatively low reflectivity, while a relatively small amount of illumination light emitted from the wide-interval areas 17b is transmitted through the areas of the diffuser plate 15a having relatively high reflectivity.

In the liquid crystal display device 10 of the present preferred embodiment having the above construction, the diffuser plate 15a or optical member 15 provided in the backlight device 12 has higher reflectivity at the ends of its plane than at the center. Therefore, the center of the diffuser plate 15a can transmit a relatively large amount of light from the cold cathode tubes 17, and thereby illumination light with enhanced brightness can be applied to the central area of the liquid crystal panel 11. Thus, the present construction can contribute to enhancement of the central brightness of the liquid crystal display device 10.

In the backlight device 12 included in the liquid crystal display device 10 of the present preferred embodiment, the diffuser plate 15a is constructed to have higher reflectivity at the ends than at the center in order to achieve enhancement of the central brightness, as described above. This construction also has the advantage of improving light use efficiency. That is, although the highly reflective areas at the ends cause lower illumination brightness of light applied to the liquid crystal panel 11, the reflected light can be reflected again by the inner surface or light reflecting surface of the chassis 14, resulting in improvement in light use efficiency. Particularly, the light use efficiency can be improved compared to using a diffuser plate 15a formed of a light-absorptive optical member capable of absorbing light.

Further, in the backlight device 12 included in the liquid crystal display device 10 of the present preferred embodiment, the cold cathode tubes 17 are densely arranged at the center in order to enhance the central brightness, in contrast to the sparse arrangement thereof at the ends. That is, the arrangement interval is set to be wide at the ends or, at the wide-interval areas 17b, in contrast to narrow arrangement interval at the center or, at the narrow-interval area 17a. Generally, in this case, the ends may be prone to unevenness of brightness, and the images of the cold cathode tubes 17 on the ends may be prone to being visible. However, in the present preferred embodiment, the diffuser plate 15a is constructed to have relatively high reflectivity or relatively low transmittivity at the ends of its plane. Thereby, the unevenness of brightness may be prevented, and the visible images of the cold cathode tubes 17 may be prevented. That is, the visible images of the cold cathode tubes 17 can be prevented due to the relatively low transmittivity at the ends, even if the cold cathode tubes 17 are not arranged at even intervals.

In the backlight device 12 included in the liquid crystal display device 10 of the present preferred embodiment, the diffuser plate 15a has reflectivity that increases continuously and gradually from the center to the ends. The continuous change of reflectivity of the diffuser plate 15a prevents the diffuser plate 15a from including a boundary area that can be caused by discontinuous change of reflectivity. Thereby, the generation of a defect, such as a visible boundary between light and dark, can be prevented or suppressed. Further, the diffuser plate 15a thus having reflectivity varying along its short side enables brightness change along the vertical or horizontal direction. Accordingly, the present construction is suitable for a kind of liquid crystal display device that should have brightness varying along the vertical or horizontal direction.

Figure 9:
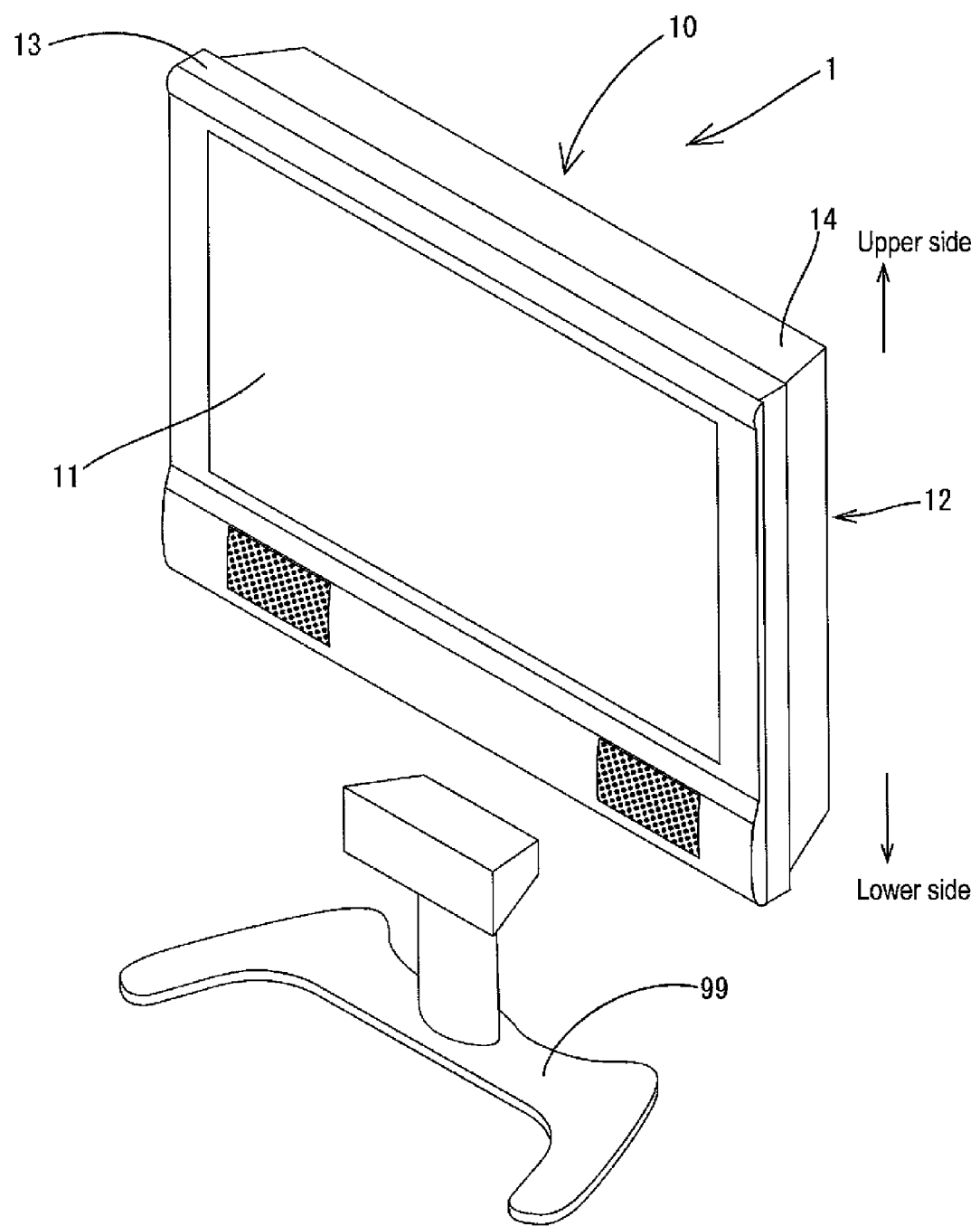
FIG. 9 is a perspective view showing a preferred embodiment of a television receiver according to the present invention.

Specifically, the present construction is suitable for a liquid crystal display device 10 used in a television receiver 1 shown in FIG. 9. The backlight device 12 of the present preferred embodiment and the liquid crystal panel 11 can be arranged so that the short side of the backlight device 12 (or, of the diffuser plate 15a) is parallel to the vertical direction of the television receiver 1. Thereby, the brightness of the television receiver 1 varying along the vertical direction can be achieved, so that brighter display is provided on the center of the display screen while darker display is provided on the ends thereof. The display screen thus including a brighter display area and darker display areas is particularly effective for a large-screen television receiver 1. It is advantageous because a display with improved visibility can be provided inexpensively with reduced number of cold cathode tubes 17. Note that brightness varying along the horizontal direction of a display screen can be also provided if necessary. That is, in the backlight device 12, 90-degree rotation of the array direction of cold cathode tubes 17 and 90-degree rotation of the direction of reflectivity change on the diffuser plate 15a will result in brightness varying along the horizontal direction.

The television receiver 1 shown in FIG. 9 includes a liquid crystal display device 10 having a liquid crystal panel 11 and the chassis 14 of a backlight, which are integrally held by a bezel 13. Further included is a stand 99 for supporting the liquid crystal display device 10 from below. When the liquid crystal display device 10 is thus incorporated and used in the television receiver 1, the liquid crystal display device 10 and therefore the backlight device 12 having the chassis 14 can be arranged so that the upper side and lower side thereof are positioned as shown in the figure. That is, the liquid crystal display device 10 is mounted on the stand 99 so that the short side of the backlight device 12 or, of the diffuser plate 15a, is parallel to the vertical direction, in the present preferred embodiment. The television receiver 1 further includes a tuner circuit not shown, and a display driving circuit for driving the liquid crystal panel 11 based on signals from the tuner circuit.

Next, various modifications of the liquid crystal display device 10 of the present preferred embodiment will be explained.

Figure 4:
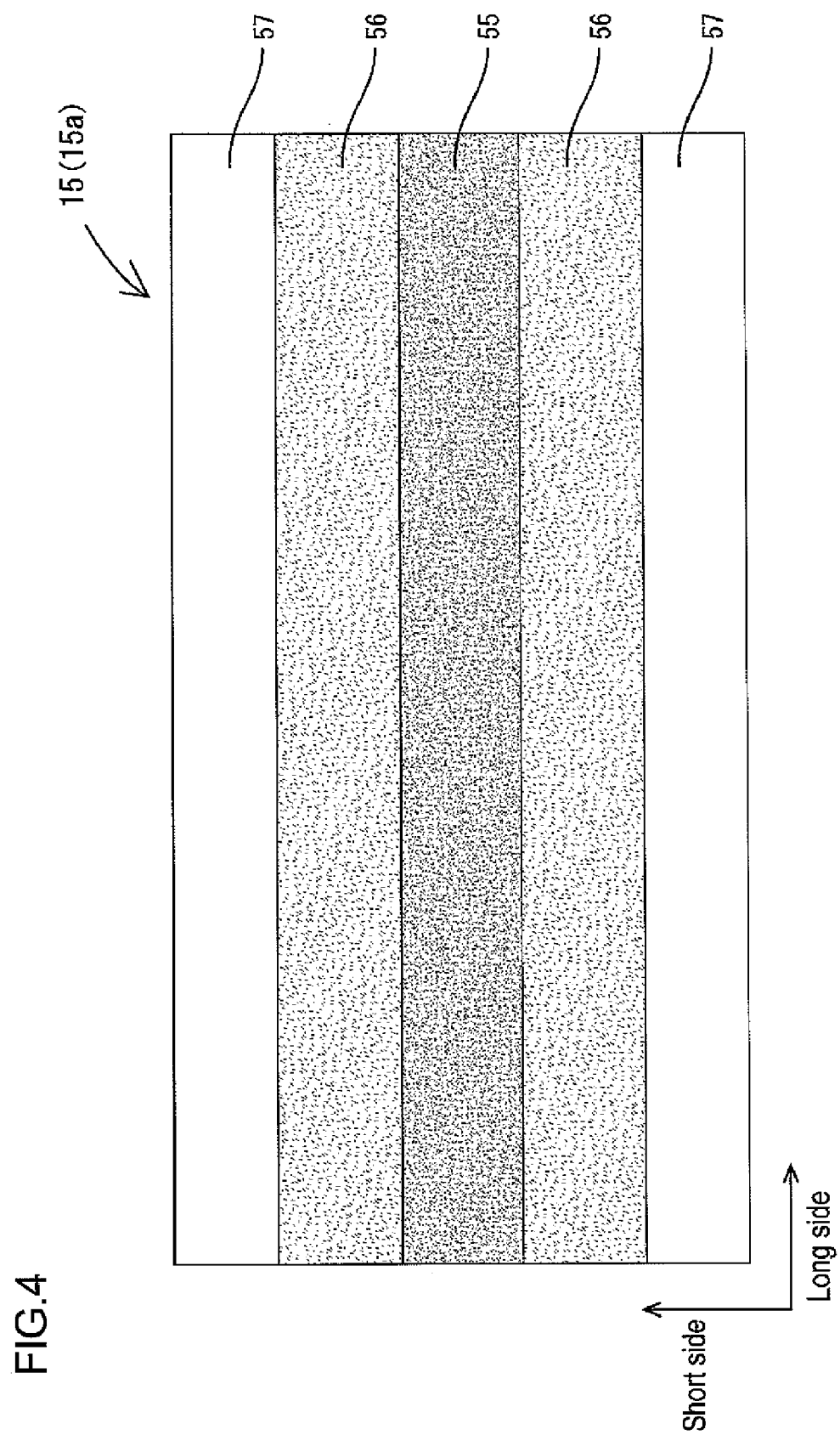
FIG. 4 is a plan view showing a modification of the diffuser plate.
Figure 11:
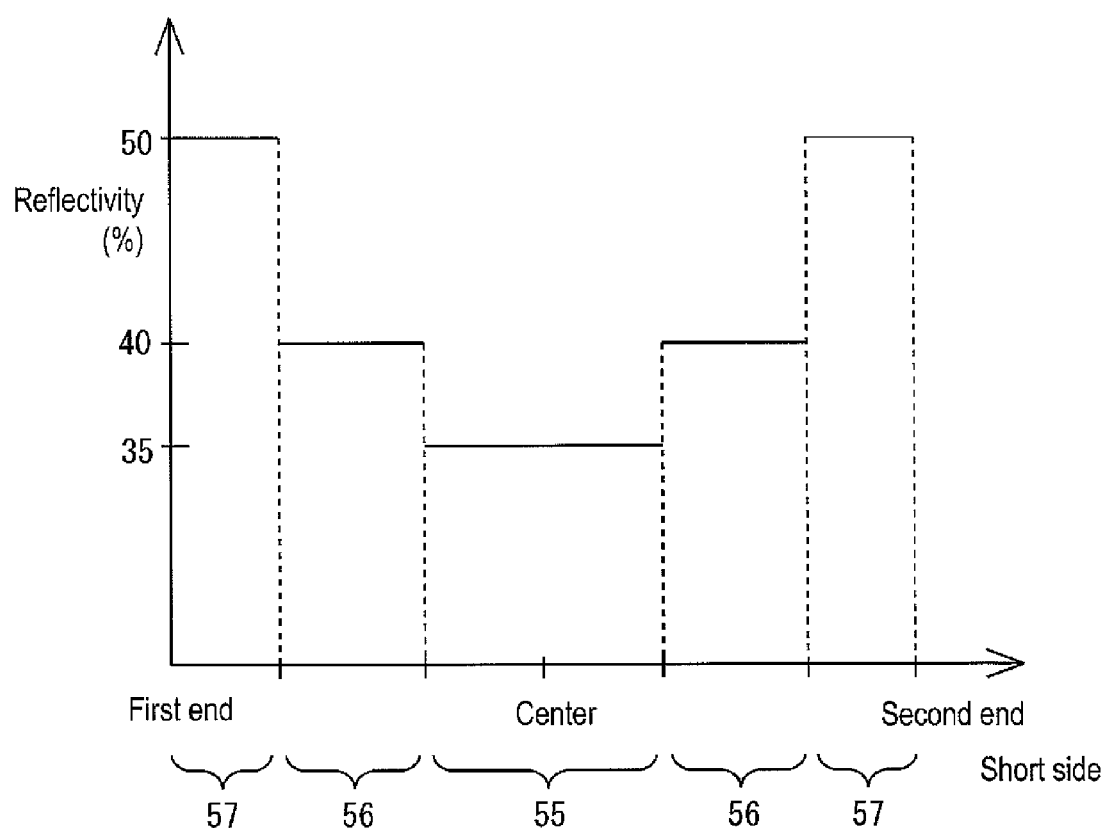
FIG. 11 is a graph showing the reflectivity that varies along the short side of the diffuser plate shown in FIG. 4.

FIG. 4 is a plan view showing a modification of the diffuser plate or optical member. FIG. 11 is a graph showing the reflectivity that varies along the short side of the diffuser plate. In contrast to the configuration shown in FIG. 3, the diffuser plate 15a shown in FIG. 4 has a configuration in which the light reflectivity increases step by step from the center of the plane of the diffuser plate 15a to the ends (See FIG. 11).

That is, the light reflectivity varies from the center to the ends along the short side of the diffuser plate 15a so as to form a striped configuration. For example, a first area 55 having relatively low light reflectivity is formed on the center, and second areas 56 and 56 having relatively higher light reflectivity than that of the first area 55 are formed on the both sides of the first area 55. Further, third areas 57 having relatively higher light reflectivity than that of the second areas 56 are formed on the sides of the second areas 56. The light reflectivity of the first area 55 preferably is about 35%, for example. The light reflectivity of the second areas 56 preferably is about 40%, for example. The light reflectivity of the third areas 57 preferably is about 50%, for example.

The diffuser plate 15a is thus constructed to have light reflectivity that increases step by step from the center to the ends, so that the plane of the diffuser plate 15a includes a plurality of areas 55, 56 and 57 having different light reflectivities. The light reflectivity is higher at the end areas 56 or 57 than at the center area 55.

In this case, the diffuser plate 15a can be manufactured by a simple method, resulting in contribution to cost reduction. That is, the areas 55, 56 and 57 can be formed by attachment or application of the construction material of the diffuser plate 15a, and consequently the diffuser plate 15a can be manufactured readily.

Figure 5:
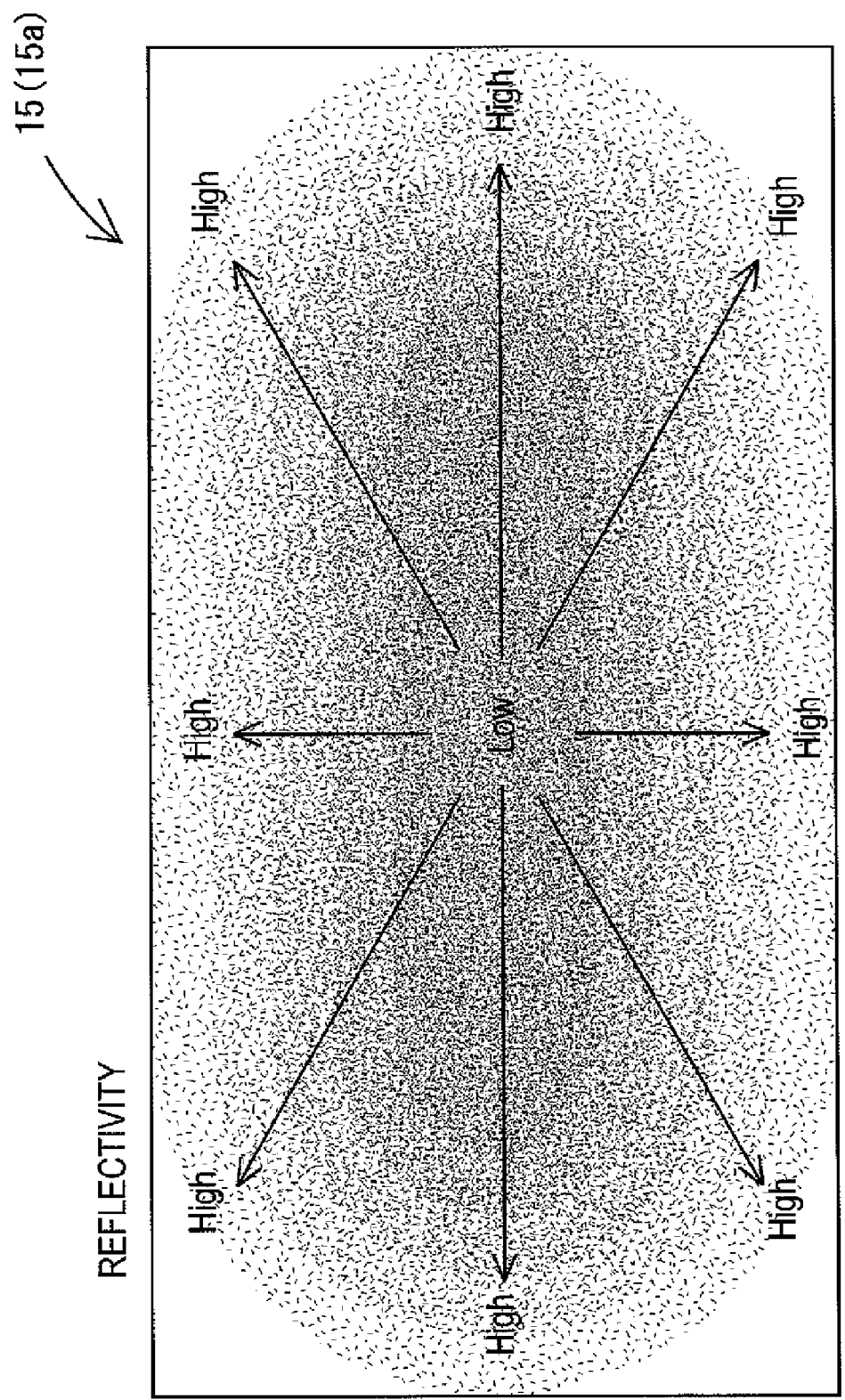
FIG. 5 is a plan view showing another modification of the diffuser plate.

FIG. 5 is a plan view showing another modification of the diffuser plate or optical member. The diffuser plate 15a shown in FIG. 5 has light reflectivity that increases continuously and gradually from the center of the plane of the diffuser plate 15a to the ends, as in the construction shown in FIG. 3. However, specifically in the present construction, the light reflectivity varies from the center to the ends so as to form a radial configuration.

The diffuser plate 15a thus having light reflectivity varying radially from the center to the ends enables the brightness to vary radially from the center. Accordingly, the backlight device including a diffuser plate 15a of the present construction is suitable for a kind of liquid crystal display device that should have radially-varying brightness.

Figure 6:
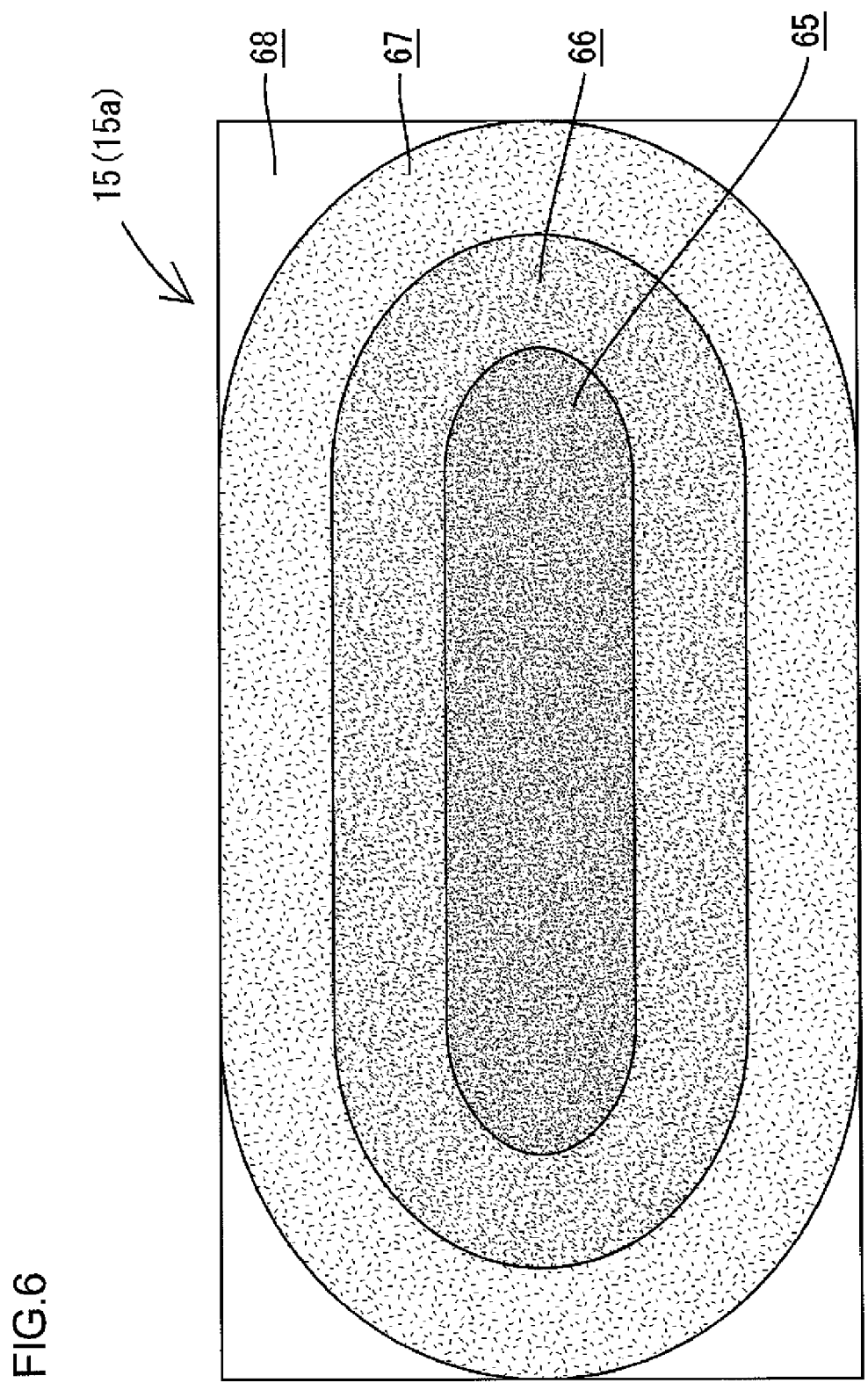
FIG. 6 is a plan view showing another modification of the diffuser plate.

FIG. 6 is a plan view showing another modification of the diffuser plate or optical member. The diffuser plate 15a shown in FIG. 6 has light reflectivity that varies from the center to the ends so as to form a radial configuration, as in the construction shown in FIG. 5. However, specifically in the present construction, the light reflectivity increases step by step from the center to the ends.

That is, the light reflectivity varies radially and step by step from the center of the diffuser plate 15a to the ends. For example, a first area 65 having relatively low light reflectivity is formed on the center, and a second area 66 having relatively higher light reflectivity than that of the first area 65 is formed on the periphery of the first area 65. A third area 67 having relatively higher light reflectivity than that of the second area 66 is formed on the periphery of the second area 66. A fourth area 68 having relatively higher light reflectivity than that of the third area 67 is formed on the periphery of the third area 67. The light reflectivity of the first area 65 preferably is about 35%, for example. The light reflectivity of the second area 66 preferably is about 40%, for example. The light reflectivity of the third area 67 preferably is about 45%, for example. The light reflectivity of the fourth area 68 preferably is about 50%, for example.

The diffuser plate 15a is thus constructed to have light reflectivity that increases radially and step by step from the center to the ends, so that the plane of the diffuser plate 15a includes a plurality of areas 65, 66, 67 and 68 having different light reflectivities. The light reflectivity is higher at the end area 66, 67 or 68 than at the center area 65.

In this case, the diffuser plate 15a can be manufactured by a simple method, resulting in contribution to cost reduction. That is, the areas 65, 66, 67 and 68 can be formed by attachment or application of the construction material of the diffuser plate 15a, and consequently the diffuser plate 15a can be manufactured readily.

Figure 7:
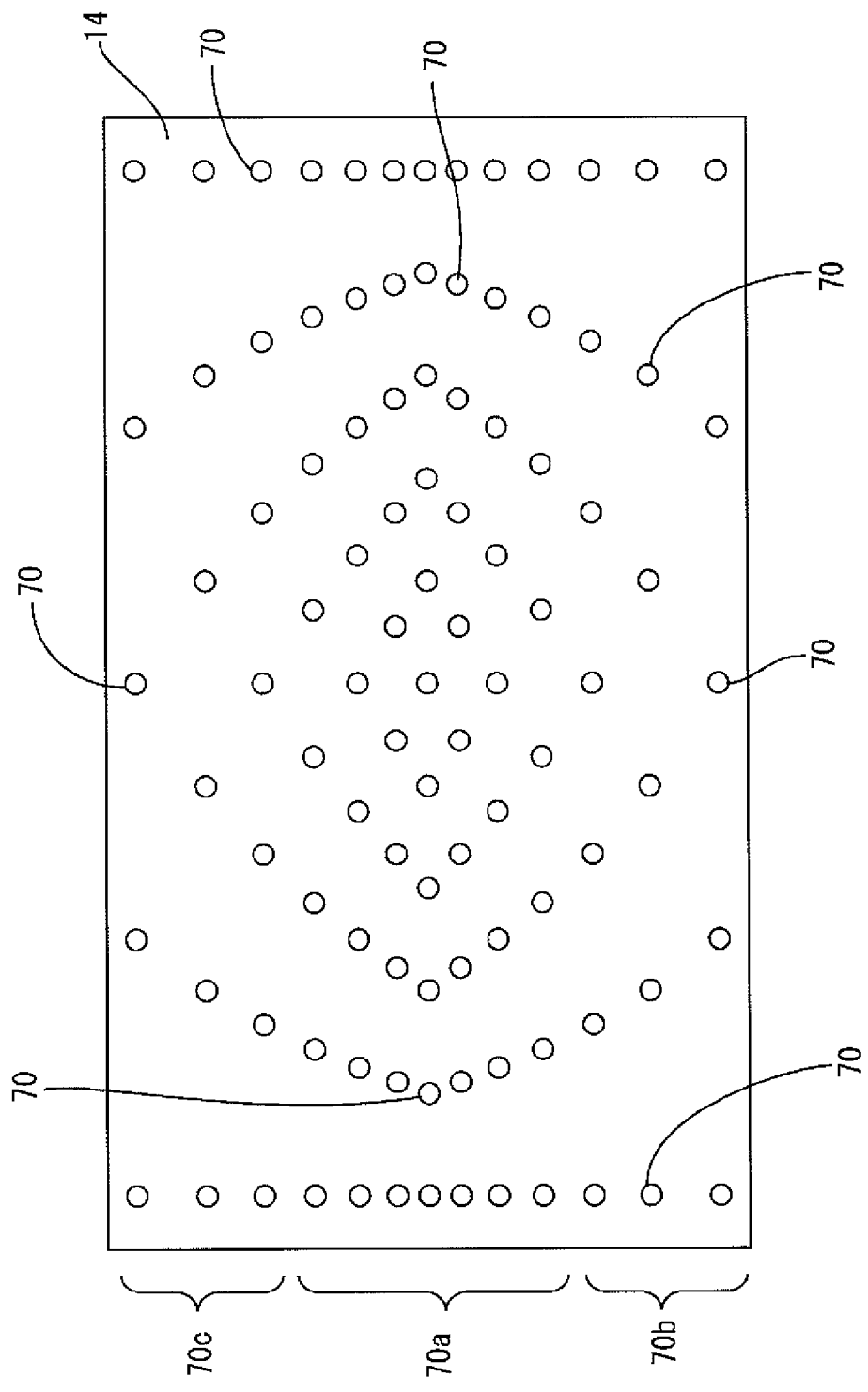
FIG. 7 is an explanatory diagram showing a modification of light sources mounted to a chassis.

FIG. 7 is an explanatory diagram showing a modification of light sources mounted to the chassis 14. In the construction shown in FIG. 7, a plurality of LED light sources 70 as point light sources are scattered and mounted on the chassis 14. According to the construction thus including LED light sources 70, the arrangement or distribution of the LED light sources 70, or the number density thereof, on the plane of the backlight device 12 can be arbitrarily designed, and thereby the design of brightness distribution on the plane can be facilitated.

In the construction shown in FIG. 7, for example, the LED light sources 70 are more densely arranged at the center 70a of the plane of the backlight device 12 or, of the chassis 14 than at the ends 70b and 70c. The LED light sources 70 on the center 70a are thus arranged at relatively smaller intervals than those on the ends 70b and 70c, so that the number density of the LED light sources 70 is higher at the center 70a. Thereby, enhancement of the central brightness can be achieved.

Generally, in this case, the images of the LED light sources 70 in the end areas may be prone to being visible, because the number density of the LED light sources 70 is low at the ends 70b and 70c. However, in the present preferred embodiment, the reflectivity of the diffuser plate 15a is high at the ends thereof as described above, so that the light transmittivity is reduced to low. Thereby, the generation of defects, such as visible images of LED light sources 70, can be prevented or suppressed.

Further, the central area of the diffuser plate 15a with relatively low reflectivity is arranged to overlap with the area where the LED light sources 70 are arranged relatively densely, as in the construction shown in FIG. 12 that includes cold cathode tubes 17. The end areas of the diffuser plate 15a with relatively high reflectivity are arranged to overlap with the areas where the LED light sources 70 are arranged relatively sparsely. Therefore, a relatively large amount of illumination light emitted from densely-arranged LED light sources 70 is transmitted through the area of the diffuser plate 15a having relatively low reflectivity so as to be applied to the liquid crystal panel 11, while a relatively small amount of illumination light emitted from sparsely-arranged LED light sources 70 is transmitted through the areas of the diffuser plate 15a having relatively high reflectivity.

These are the explanations for various preferred embodiments of the present invention and the modifications thereof, made with reference to the drawings. However, the present invention is not limited to the preferred embodiments and modifications explained in the above description made with reference to the drawings. The following preferred embodiments may be included in the technical scope of the present invention, for example, and further the present invention may be embodied in various forms without departing from the scope of the invention.

Figure 8:
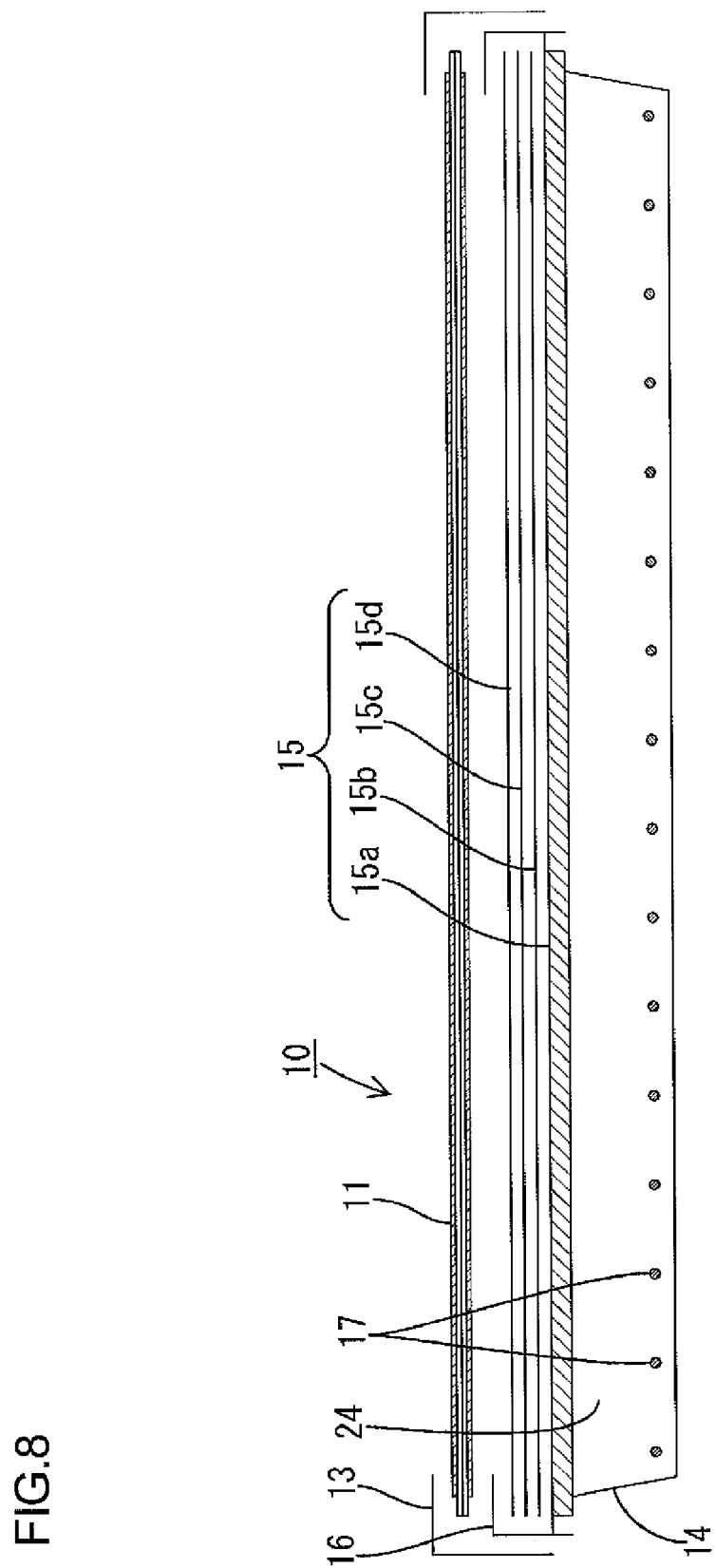
FIG. 8 is a sectional view showing the general construction of a liquid crystal display device as a modification.

In the above preferred embodiments, the cold cathode tubes 17 are preferably arranged so that the narrow-interval area 17a and the wide-interval areas 17b are provided as shown in FIG. 2. However, the diffuser plate having the configuration according to a preferred embodiment of the present invention can be also used in a construction that includes cold cathode tubes 17 evenly arranged in the plane, as shown in FIG. 8, for example. Also in this case, the diffuser plate can contribute to enhancement of the central brightness.

In the above described preferred embodiments, the cold cathode tubes 17 are preferably used as lamps. However, a construction that uses other types of lamps such as hot cathode tubes may be also included in the present invention.

In the above preferred embodiments, the TFTs are preferably used as switching elements. However, the present invention can be applied to a liquid crystal display device that uses TFDs (thin-film diodes), for example. Further, the present invention can be applied to a liquid crystal display device for monochrome display, as well as a liquid crystal display device capable of color display.

In the above preferred embodiments, a liquid crystal display device is shown as an example. However, the present invention can be applied to other types of display devices than a liquid crystal type, which use a backlight device.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A lighting device to be used for a display device having a display panel, said lighting device comprising:
   a light source including a plurality of point light sources that are positioned directly below the display panel; and
   an optical member having a plate shape and being arranged between said light source and said display panel; wherein
   said optical member has light reflectivity that is higher at an end of a plane of said optical member than at a center of the plane; and
   said plurality of point light sources are arranged in a planar area corresponding to the plane of said optical member such that a number of the plurality of point light sources is higher in a central portion of said planar area than in an end portion of said planar area.

2. A lighting device as in claim 1, wherein the light reflectivity of said optical member increases continuously and gradually from said center to said end.

3. A lighting device as in claim 2, wherein said light reflectivity varies from said center along a side of the plane of said optical member.

4. A lighting device as in claim 2, wherein said light reflectivity varies from said center so as to define a radial configuration.

5. A lighting device as in claim 1, wherein the light reflectivity of said optical member increases step by step from said center to said end.

6. A lighting device as in claim 5, wherein said light reflectivity varies from said center so as to define a striped configuration.

7. A lighting device as in claim 5, wherein said light reflectivity varies from said center so as to define a radial configuration.

8. A lighting device as in claim 1, wherein said plurality of point light sources are arranged more densely in an area that overlaps with said center of the plane of said optical member, than in an area that overlaps with said end of the plane of said optical member.

9. A lighting device to be used for a display device having a display panel, said lighting device comprising:
   a light source including a plurality of linear light sources; and
   an optical member being arranged between said light source and said display panel, said optical member having a plate shape; wherein
   said optical member has light reflectivity that is higher at an end of a plane of said optical member than at a center of the plane; and
   said plurality of linear light sources are arranged parallel or substantially parallel to each other in a planar area corresponding to the plane of said optical member such that an interval between individual ones of the plurality of linear light sources is narrower in a central portion of said planar area than in an end portion of said planar area.

10. A lighting device as in claim 9, wherein said plurality of linear light sources are arranged at a narrower interval in an area that overlaps with said center of the plane of said optical member, than in an area that overlaps with said end of the plane of said optical member.

11. A lighting device as in claim 9, wherein the light reflectivity of said optical member increases continuously and gradually from said center to said end.

12. A lighting device as in claim 11, wherein the light reflectivity varies from said center along a side of the plane of said optical member.

13. A lighting device as in claim 11, wherein the light reflectivity varies from said center so as to define a radial configuration.

14. A lighting device as in claim 9, wherein the light reflectivity of said optical member increases step by step from said center to said end.

15. A lighting device as in claim 14, wherein the light reflectivity varies from said center so as to define a striped configuration.

16. A lighting device as in claim 14, wherein the light reflectivity varies from said center so as to define a radial configuration.

* * * * *